(12) United States Patent
Brough et al.

(10) Patent No.: US 7,949,625 B2
(45) Date of Patent: May 24, 2011

(54) AUTOMATED MANAGEMENT OF BRAND RULES FOR PROVIDING CONTENT

(75) Inventors: Hans Alhden Brough, Brisbane, CA (US); Jeffrey Michael Paul, Pleasant Hill, CA (US); Jonathan Frederick Schupp, Smithsburg, MD (US)

(73) Assignee: Corbis Corporation, Seattle, WA (US)

( * ) Notice: Subject to any disclaimer, the term of this patent is extended or adjusted under 35 U.S.C. 154(b) by 494 days.

(21) Appl. No.: 11/539,582

(22) Filed: Oct. 6, 2006

(65) Prior Publication Data

US 2008/0086439 A1 Apr. 10, 2008

(51) Int. Cl.
*G06F 17/00* (2006.01)
*G06N 5/02* (2006.01)
(52) U.S. Cl. .............................. 706/47; 705/27; 352/85
(58) Field of Classification Search ........ 707/3; 706/47; 705/1, 26
See application file for complete search history.

(56) References Cited

U.S. PATENT DOCUMENTS

| | | | |
|---|---|---|---|
| 5,535,320 A | 7/1996 | Gay et al. | |
| 6,931,591 B1 | 8/2005 | Brown et al. | |
| 2002/0103688 A1* | 8/2002 | Schneider | 705/8 |
| 2005/0159962 A1* | 7/2005 | Weiss et al. | 705/1 |
| 2007/0094076 A1* | 4/2007 | Perkowski et al. | 705/14 |

* cited by examiner

*Primary Examiner* — Donald Sparks
*Assistant Examiner* — Kalpana Bharadwaj
(74) *Attorney, Agent, or Firm* — Frommer Lawrence & Haug LLP; David W. Foster; John W. Branch

(57) ABSTRACT

Automated assistance is provided for managing rules and/or guidelines regarding the usage of branded content for a project, e.g., an advertising campaign, event, signage, decoration, and the like. One or more queries regarding the project are presented to the user. Based on the user's responses to the queries, branded content that is approved for the project's intended use(s) is automatically identified and made available to the user. The determination of which digitized content (media objects) to provide to the user is based at least in part on brand rules and/or guidelines that can be relatively static or dynamically updated by the current user.

26 Claims, 11 Drawing Sheets

Please answer all of the questions below. Once completed, all logos that meet the entered criteria will be available for download, in the order of preferred usage. Also note that when downloading you will be given a choice to select either a low resolution or high resolution version. For more information about the correct usage of ABC Corp. logos, please refer to the ABC Corp. Brand guidelines. If you need a logo for use on stadium signage or a logo that includes a campaign tagline such as Yes you can, please contact the Brand team at Brandgroup@ABCCorp.com.

Start Over

Top of Form

1. Is your project online-focused (e.g., website, HTML email, online banners, etc.)
    Yes, I need a logo for use in an online project.
    No, I need a logo for a print or traditional media project.

2. If your project is online-based, do you need a logo for a header?
    Yes, I need a logo for use in a header.
    No, the logo will not be used in a header.

3. Upon which background color will the logo appear?

4. Will your project (presentation, print ad, flier, etc.) be in use/in market past 1Q06?
    Yes, my project will be used past 1Q06.
    No, this project will be out of circulation before 1Q06.

5. Would it be too costly/time consuming to remove "Together with PARTNER" from your project (e.g., billboard, building signage, etc.) if required from Brand?
    Yes, the time and cost to re-brand would be extensive.
    No, it would be easy and inexpensive to re-brand.

6. Is the project a piece in which the preferred horizontal logo would appear too small to be effective, such as a vertical poster, a banner, a podium, etc.?
    Yes, my project requires a vertical logo.
    No, I can use a horizontal logo.

7. Select a Logo:
    Please answer the above questions to view a selection of appropriate Logo's.

Start Over

Thank you for using the Logo Dispenser to find a logo for your project. If you believe that another logo is best suited for your project, please email the Brand team at Brandgroup@ABCCorp.com.

AUTOMATED MANAGEMENT OF BRAND RULES FOR PROVIDING CONTENT

FIELD OF THE INVENTION

The invention is directed to the management of content for a project, and more particularly, automating the management of rules governing which media objects are to be provided for use with a particular project.

BACKGROUND OF THE INVENTION

A content management system, such as a Digital Asset Management system (DAM) is often employed to enable multiple users to store, search, and access content that is owned or licensed by an organization. This content is generally provided as one or more media objects in a digital format, such as pictures, text, videos, graphics, illustrations, images, audio files, fonts, colors, and the like. Also, some of the content may be designated for use with a brand for a particular type of product and/or service. Additionally, the usage of the brand related content is typically determined by one or more rules and/or guidelines that are provided by the organization. In the past, these rules were mostly manually enforced to control the usage of brand content managed by a DAM system.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

FIG. 4A shows a sample web page with a list of questions, used to determine a media object to use;

FIG. 4B illustrates the sample web page of FIG. 4A with some of the questions partially answered;

FIG. 4C shows a meta data schema that includes descriptive fields for a media object;

DETAILED DESCRIPTION OF THE INVENTION

Figure 1:
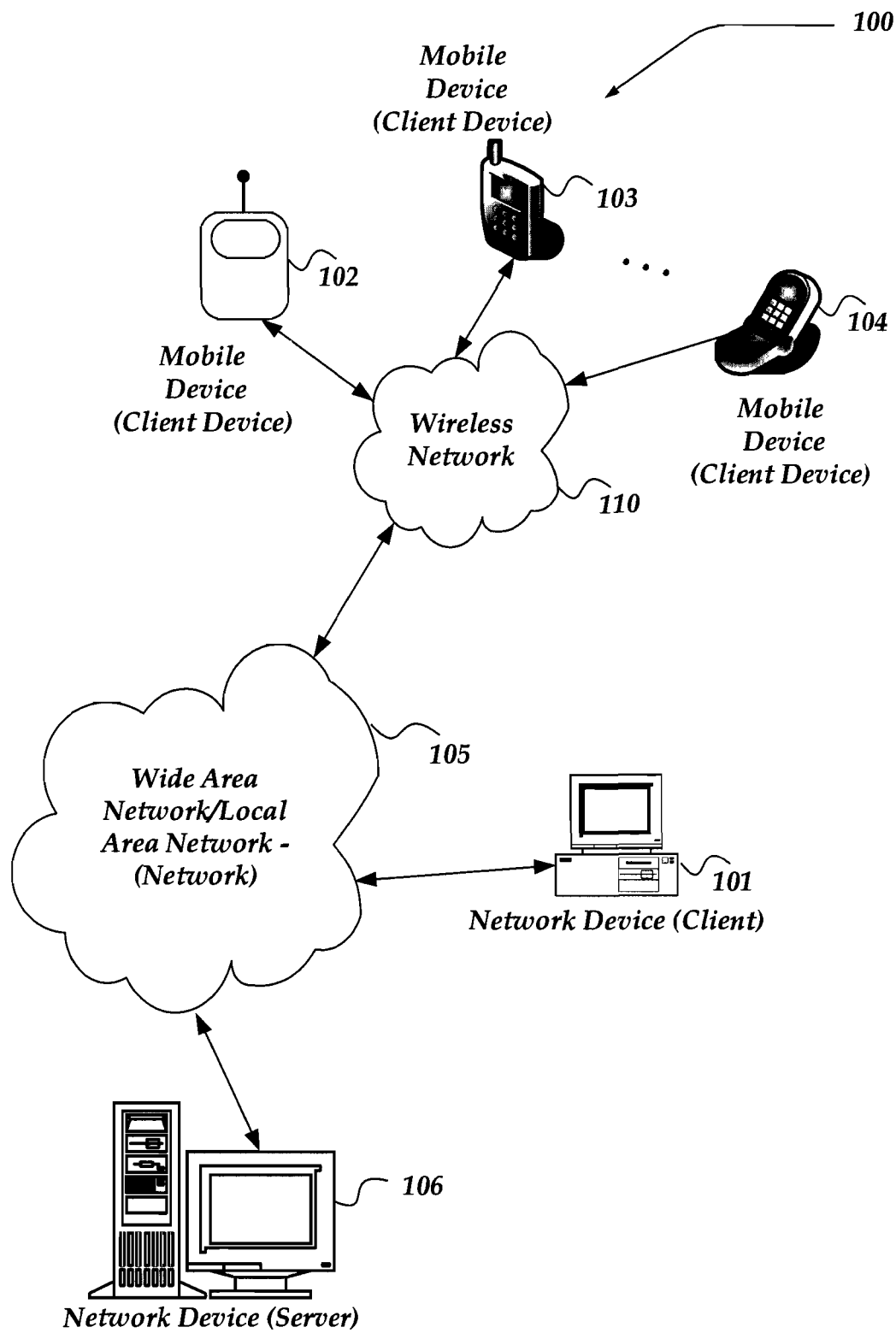
FIG. 1 illustrates a system diagram of one embodiment of an environment in which the invention may be practiced.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be implemented in different embodiments as methods, processes, processor readable mediums, systems, business methods, or devices. Accordingly, the present invention may take the form of an entirely hardware embodiment, an entirely software embodiment or an embodiment combining software and hardware aspects. The following detailed description is, therefore, not to be taken in a limiting sense.

The invention is generally directed to providing automated assistance in managing rules and/or guidelines regarding the usage of branded content for a project, e.g., an advertising campaign, event, signage, decoration, presentation, and the like. Initially, one or more queries regarding the project are presented to the user. Based on the user's responses to the queries, other queries may be presented until branded content that is approved for the project's intended use(s) is automatically identified and made available to the user. The determination of which content to provide to a user is based at least in part on rules and/or guidelines regarding a brand that can be relatively static or dynamically updated.

Generally, as used in this application, a brand is a representation of a level of quality, value, and/or association with a specific known source of goods/services, e.g., an organization, individual, line of products/services. The brand can be embodied in different forms of electronic content, which can include media objects that can be communicated electronically over a network and/or included in a processor readable media. Also, a brand's "value" is typically reflected in how the product/service, and/or organization/individual, is perceived by their target audience or the marketplace generally. Different meanings and therefore different values can be associated with different audiences. Furthermore, the meaning and the value of the brand for each audience is typically employed to develop rules and guidelines for marketing products and/or services to each target audience. Additionally, the value of a brand for a web-based company may have a heightened importance due at least in part to the somewhat intangible nature of providing goods and/or services over a network vis-à-vis a brick and mortar facility.

Rules and/or guidelines for a brand are employed to evaluate the uses for a media object. These rules and/or guidelines can be employed to generate a logical decision tree of queries, which are displayed to the user. Based on the user's response to these queries, a media object can be subsequently provided to the user for use in a particular project. In yet at least another embodiment, a template of exemplary rules and guidelines can be provided for a new user that has not provided any. Based in part on a user's responses to a template of general queries, at least basic usage rules and guidelines for media objects can be generated for the new user.

In still another embodiment, the rules/guidelines can employ the format/type of a file and/or an application provided for a user's project to identify one or more media objects for a particular use. For example, if a user indicated a particular presentation file format for a project, those media objects suitable for use/display with the corresponding presentation application would be provided for consideration by the user. Further, other media objects unsuitable for use with the provided presentation file format wouldn't be provided, but might be presented as available for use if a different type of presentation application could be employed for that particular project.

Additionally, in at least one embodiment, if a brand rule and/or guideline regarding the use of a media object changes, the availability of that object for intended and/or actual use can be dynamically updated. For example, the availability of a media object for use in a presentation application can be dynamically updated based on a new change to a rule/guideline regarding its usage with a presentation. Also, each change to a rule and/or guideline for use with a brand can be dynamically updated in a database that is linked to an index of the media objects.

In at least one other embodiment, different types of rules and/or guidelines may be provided that can consider one or more factors of a user's project, including, but not limited to, geographic location, venue, target audience, price, duration, season, event, holiday, special occasion, type of media object requested, type of project, and the like. In one embodiment, these factors are provided by the user in response to one or more queries, and in other embodiments, these factors can be stored in a profile associated with, or selected by, the user.

A media object is an electronic form of content whose use with a brand can be controlled by rules and/or guidelines. Media objects can include, but are not limited to, alphanumeric text, symbols, images, pictures, illustrations, graphics, fonts, characters, cartoons, video, color, service marks, trademarks, trade dress, audio recordings, drawings, presentations, advertisements, and the like. Additionally, a media object includes a unique identifier. In at least one embodiment, the unique identifier can be configured as metadata that can be arranged in one or more configurations, including but not limited to, XMP, EXIF, and IPTC. This metadata can include time and date information, geographic limitations, type(s) of approved uses such as an advertising campaign, and the like. Moreover, the unique identifier and/or the metadata can be employed to automatically map a media object to brand usage rules and/or guidelines.

Also, in at least one embodiment, the unique identifier for a media object can be configured as an object such as a smart object, digital object identifier (DOI), and/or a handle. This unique identifier may be included in a header of a file and/or injected into the actual data that characterizes the media object. One or more methods may be employed to inject a unique identifier into content contained in a media object's file, including, but not limited to, steganography, watermarking, and hard coding.

In one embodiment, a Handle System is employed to handle the unique identifiers for media objects. The Handle System provides a resolution service for media objects over a network, such as the Internet. The arrangement of the Handle System is somewhat similar to a Domain Name System (DNS), except that it is tailored for resolving unique identifiers of media objects instead of uniform resource locators (URLs) for websites. There are several Requests For Comment (RFCs) that explain the specific details of the Handle System, including RFC3650, 3651, and 3652. Additionally, the Handle System can be used to locate repositories that contain media objects given their unique handles. Other features of the Handle System include: (1) open, relatively well-defined protocol and data model; (2) infrastructure for application domains, e.g., images, music, digital libraries; (3) interoperability between many different information systems; and (4) a DNS can operate on the Handle System.

Additionally, if a unique identifier is configured with a media object as a DOI, handle, and/or smart object, it can provide at least some functionality, e.g., (1) addressing and resolvability over a network via a resolution system; (2) include a payload that conforms to a metadata description; (3) address that can be specified by a particular syntax; (4) invoke a method; and/or (5) universal operability.

In one or more embodiments, the invention can be implemented as an application or applet, which is separate from and/or a plug-in for another application such as an editor, word processor, DAM, presentation application, spreadsheet application, and the like. The invention can be arranged in different environments, including, but not limited to, host, peer to peer, client-server, and the like. One or more of these environments could also include a web server that provides access to information and media objects over a network by at least a browser application. In at least one embodiment, the rules/guidelines can be expressed in a database where newly received and previously received media objects can be indexed. Additionally, in at least one embodiment, the rules and/or guidelines for a brand can be managed in a virtual style book that controls at least some of the usage of media objects with the brand.

Illustrative Operating Environments

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, server network device 106, mobile devices (clients) 102-104, and client network device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, media players, video game consoles, multimedia computing platforms, integrated devices combining one or more of the preceding devices, and the like. As such, mobile devices 102-104 typically range widely in terms of capabilities and features. For example, a mobile telephone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol (WAP) message, and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, graphical content, audio content, and the like. This client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to process. Such information may be provided in a message, or the like, sent to server network device 106, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as Network Device 106, client device 101, or the like. However, the present invention is not limited to these message protocols, and virtually any other message protocol may be employed.

Mobile devices 102-104 and client network device 101 may further be configured to include a client application that enables a user to log into a customer account that may be managed by another computing device, such as server network device 106. Such customer account, for example, may be configured to enable the user to search for content, browse web pages, select content for purchase, and select uses for the selected content, or the like. However, participation in these activities may also be performed without logging into a customer account.

Client network device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, network appliances, or the like.

Wireless network 110 is configured in part to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, Wifi networks, Wimax networks, cellular telephone networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple server network device 106 and its components with other computing devices, including, client network device 101, and through wireless network 110 to mobile devices 102-104. Network 105 is enabled to employ any form of processor readable media for communicating information from one networked electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between server network device 106, client device 101, and other computing devices.

One embodiment of server network Device 106 is described in more detail below in conjunction with FIG. 3. Briefly, however, server network device 106 may include any computing device capable of connecting to network 105. Further, server network device 106 enables one or more server applications to communicate with clients and/or other server applications operating on other computing devices. The server applications can include, but are not limited to, one or more of content server 356, web server 354, brand content server 355, and/or Digital Asset Management server 353. Further, server network device 106 can be arranged to include client applications such as browser 351, media object program 352, and the like.

Furthermore, although FIG. 1 illustrates server network device 106 as a single computing device, the invention is not so limited. For example, one or more functions or applications of server network device 106 may be distributed across one or more other network devices without departing from the spirit and scope of the invention.

Illustrative Mobile Client Environment

Figure 2:
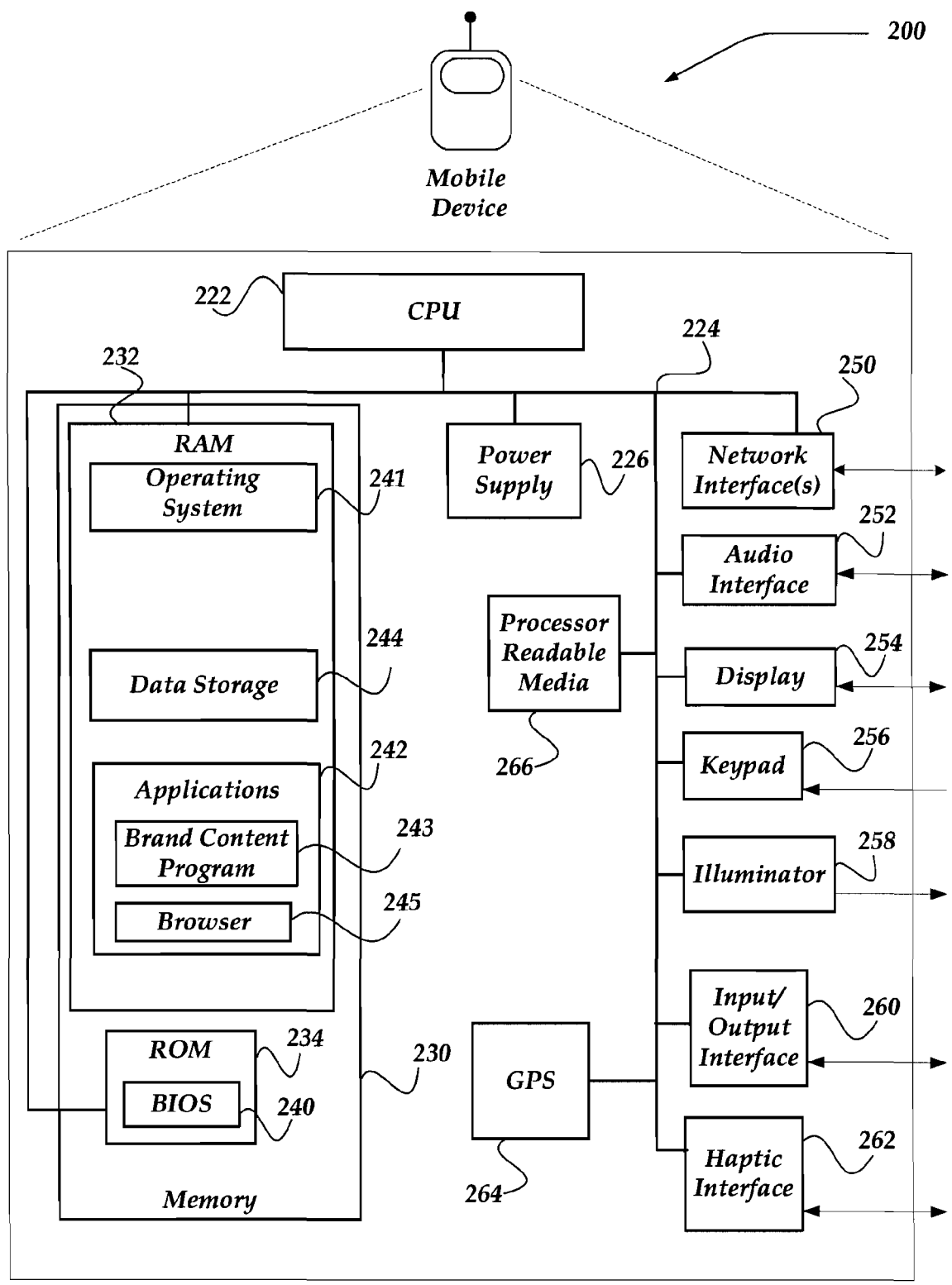
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264, and processor readable media 266. Media 266 may include, but is not limited to, hard discs, floppy disks, memory cards, optical discs, and the like. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is arranged for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store social networking information including vitality information, or the like. At least a portion of the social networking information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may further include browser 245 and brand content program 243.

Brand content program 243 may be configured either individually or in combination with browser 245 to enable searching and displaying of pages of content that is available for a project based on at least one response to at least one query. Program 243 can also enable a customer to download selected content for the project. In one embodiment, brand content program 243 enables a user to provide responses to queries regarding intended usage of content for a project, where approved uses are based on at least one previously provided rule and/or guideline. Various embodiments of the processes for brand content program 243 are described in more detail below in conjunction with FIGS. 4-11.

Illustrative Network Device

Figure 3:
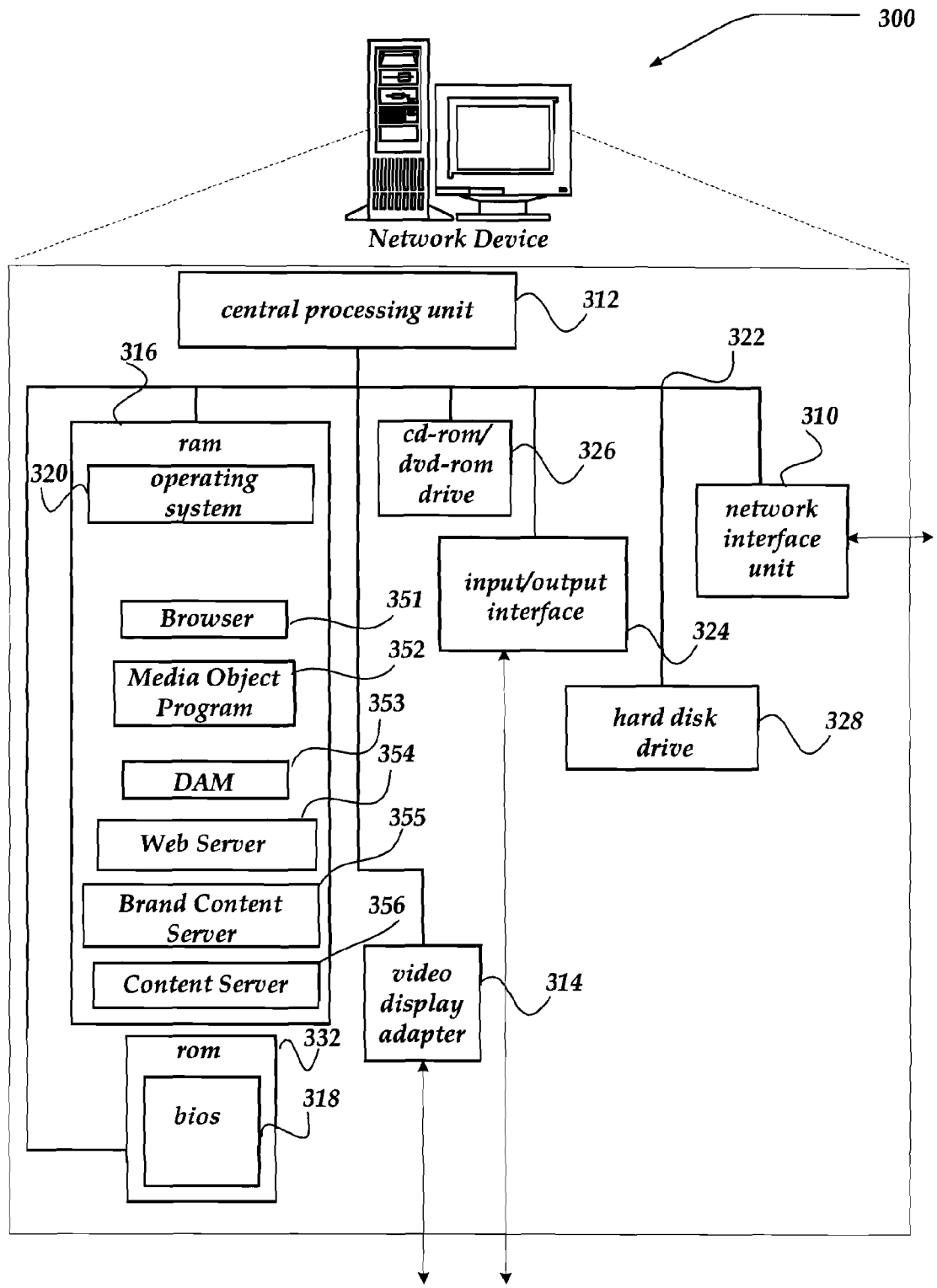
FIG. 3 illustrates one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may be arranged to represent, for example, server network device 106 or client network device 101 of FIG. 1.

Network device 300 includes processing unit 312, video display adapter 314, and a mass memory, all in communication with each other via bus 322. The mass memory generally includes RAM 316, ROM 332, and one or more permanent mass storage devices with processor readable media, such as hard disc drive 328, tape drive, optical drive, memory card, and/or floppy disk drive. The mass memory stores operating system 320 for controlling the operation of network device 300. It is envisioned that any general-purpose or mobile operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, or network interface card (NIC).

The mass memory as described above illustrates another type of processor-readable media, namely computer storage media. Computer storage media may include volatile, nonvolatile, removable, and non-removable processor readable media implemented in any method or technology for storage of information, such as processor readable instructions, data structures, program modules, or other data. Examples of computer storage media include RAM, ROM, EEPROM, flash memory or other memory technology, CD-ROM, digital versatile disks (DVD) or other optical storage, memory cards, magnetic cassettes, magnetic tape, magnetic disk storage or other magnetic storage devices, or any other medium which can be used to store the desired information and which can be accessed by a computing device.

The mass memory also stores program code and data. One or more applications can be loaded into mass memory and run on operating system 320. Examples of application programs that may be included are transcoders, schedulers, calendars, database programs, word processing programs, HTTP programs, customizable user interface programs, IPSec applications, encryption programs, security programs, VPN programs, SMS message servers, IM message servers, email servers, account management and the like.

If network device 300 is arranged as a client device, the client applications may include browser 351 and/or media object program 352. However, if network device 300 is arranged to operate as a server, other serving applications may also be included, such as DAM 353, Web server 354, Brand Content server 355, Content server 356, and the like. Furthermore, one or more of these serving applications may be arranged on one or more network devices dedicated to providing computing resources.

Brand Content server 355 may be arranged to receive and process rules and guidelines for the use of content as a brand. Brand Content server 355 can preprocess information/data, process information/data in real time, or some combination of both to determine a price for a customer of selected content for one or more predetermined categories of use for the selected content.

Also, Brand Content server 355 can provide a user with automated assistance in managing brand rules and/or guidelines regarding the usage of content for a project, e.g., an advertising campaign, event, decoration, and the like. One or more queries regarding the project are presented to the user. Based on the user's responses to the queries, content that is approved for the project's intended use(s) is automatically provided to the user. The determination of which digital representation of the content (media object) to provide to the user is based at least in part on rules and/or guidelines that can be previously provided by an individual or organization, or provided dynamically by the current user. Generally, the brand rules, brand guidelines, and/or content can be provided for processing/preprocessing/determinations to Brand Content Server 355 by one or more other servers, RSS feeds, APIs, applications, scripts, manual edits, third party sources, content providers, and the like.

Content server 356 can be arranged to provide access to content identification information so that particular media objects can be associated with the selected brand content. Web server 354 may also be arranged to provide access to the selected brand content as a service to sources and/or resellers of selected content to customers. DAM 353 may also be arranged to incorporate the price information provided by Brand Content server 355. Additionally, network device 300 is arranged to enable one or more of the processes described below in conjunction with FIGS. 4-11.

User Interface

FIGS. 4A-4D are directed to illustrating the use of the invention to automatically employ rules to generate queries for a user for a particular type of media object, i.e., a logo, and whose answers enable a determination of a particular media object for use with a brand. However, it is clear that the invention is not so limited. Rather, this discussion is merely provided for exemplary purposes to illustrate the novel aspects of the invention in view of a relatively common use and type of media object. Clearly, in other embodiments, a user can employ the invention to consider multiple or all types of media objects for various uses with a brand.

Reference is now made to FIG. 4A, which illustrates an exemplary web page that lists of a plurality of questions whose answers are subsequently employed to select one particular type of media object, i.e., a logo, for use with a brand. Also, the web page shown in FIG. 4A can be generated from code, such as listed in APPENDIX A. The questions shown in FIG. 4A are numbered 1-7, and are denoted Q1-Q7, respectively, henceforth. Questions Q1-Q7 include yes/no and multiple choice questions. Questions Q1-Q7 are also arranged to extract usage information from a user, so as to enable the selection of one or more logos whose brand rules and/or guidelines regarding usage correspond to the usage information provided by the user's answers to the questions.

Figure 4B:
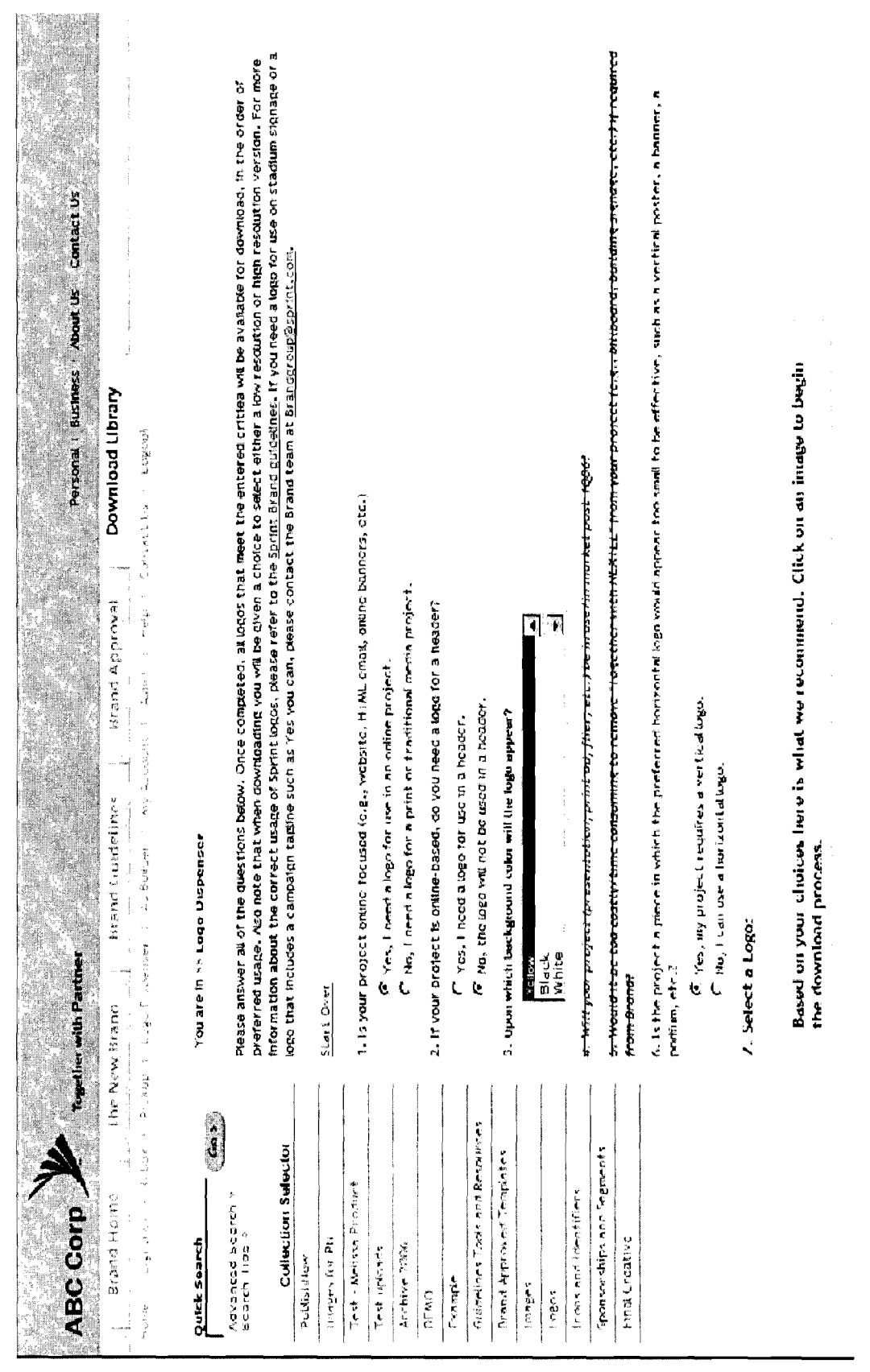

Reference is now made to FIG. 4B, which shows the sample web page of FIG. 4A with some of the questions partially answered. The user answers questions Q1-Q7 interactively. Specifically, after the user answers a question, the web page is dynamically updated to reflect the user's answer. Specific answers to some of the questions may impact the relevance of others of the questions. As such, when the web page is dynamically updated questions that are not currently relevant are flagged as such, or alternatively not displayed at all. Questions that are not relevant can be flagged by struckthrough text, as in FIG. 4B, or by grayed-out text, or by such other visual aid.

Figure 4C:
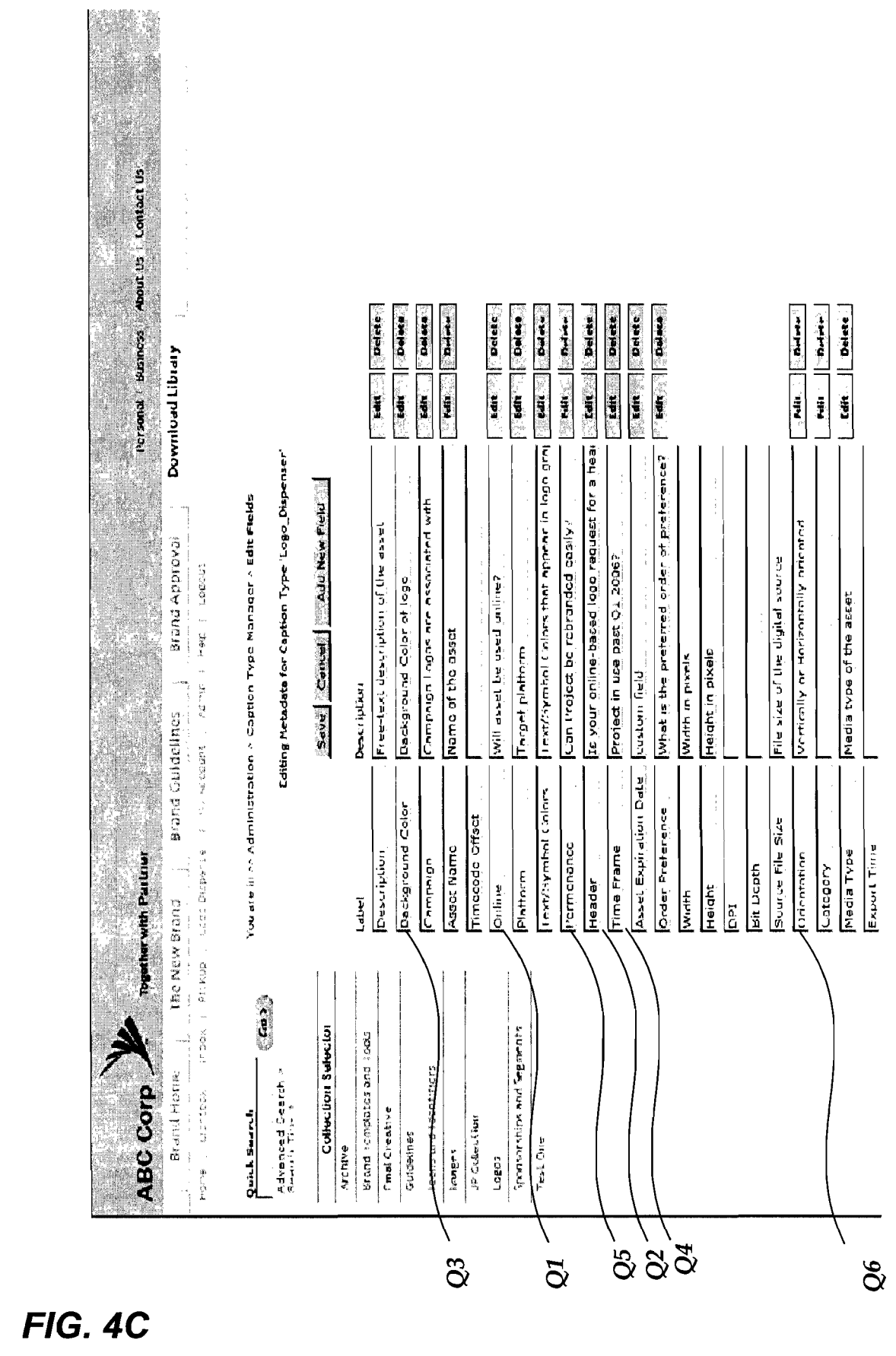
Figure 4D:
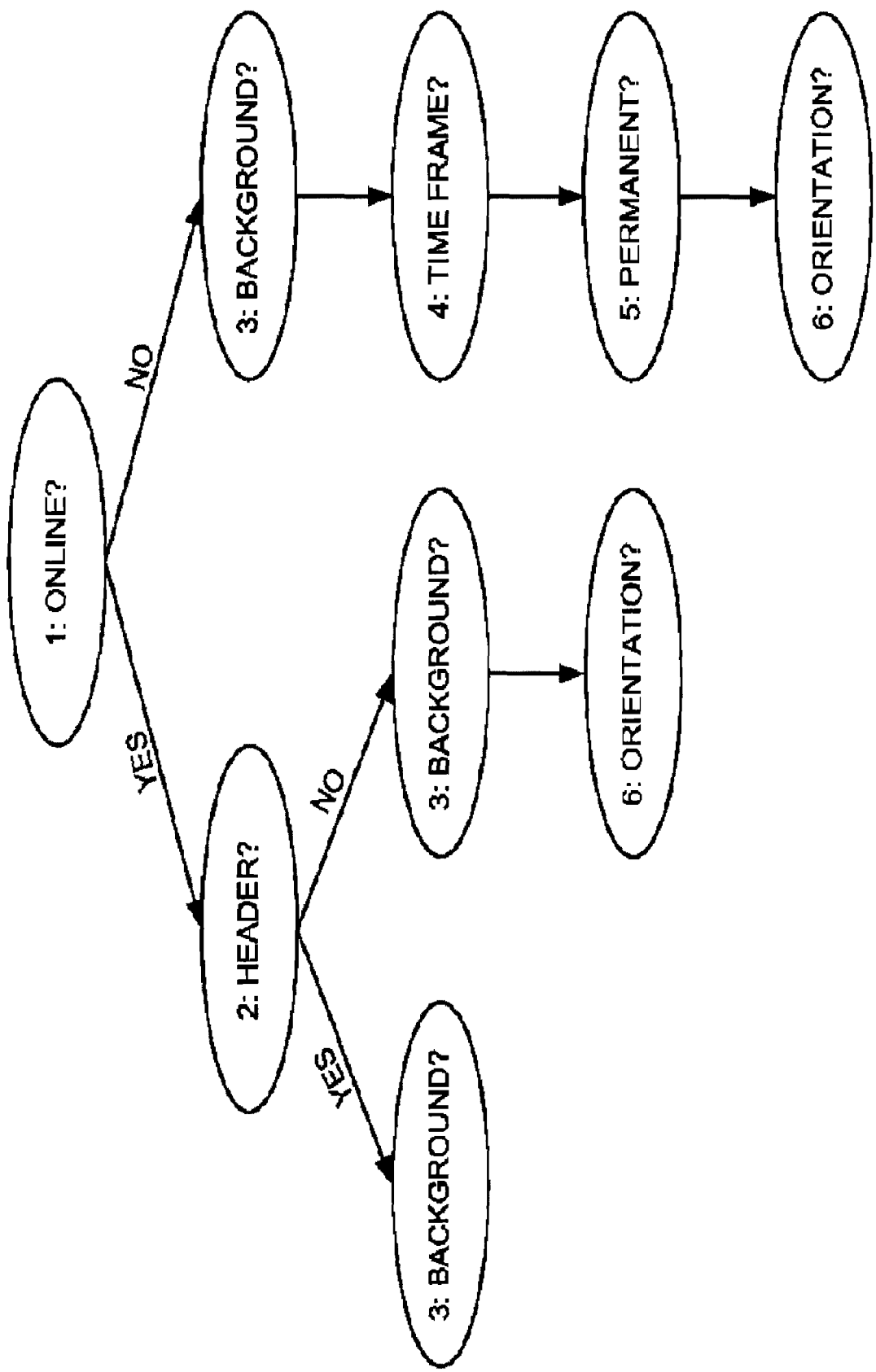
FIG. 4D illustrates a graphical representation of a decision tree directed to dynamic resolution of the questions presented in the sample web page of FIG. 4A, as answers to various questions are received from a user.

Reference is now made to FIG. 4D, which is a graphical representation of an exemplary decision tree for dynamically processing answers to the queries presented in FIG. 4A. As shown, the exemplary decision tree graph in FIG. 4D employs three business rules, as follows:

(BR1-a) If Q1 is answered affirmatively, indicating on-line usage, then Q4 and Q5 are not relevant;

(BR1-b) If Q1 is answered negatively, indicating traditional usage, then Q2 is not relevant; and (BR2) If Q2 is answered affirmatively, indicating usage within a header, then Q6 is not relevant.

The exemplary tree graph shown in FIG. 4D is but one of many embodiments of different data structures that can be employed with the invention. Yet another exemplary data structure is a table that lists the various complete subsets of relevant questions, for each combination of values of answers to those questions that impact the relevance of the others. For example, FIG. 4D shows predetermined rules such that the answers to Q1 and Q2 impact the relevance of the other questions. Exemplary TABLE I herein below provides such information.

TABLE I

Tabulated structure equivalent to FIG. 4D

| Answer to Q1 | Answer to Q2 | Remaining questions that are relevant |
|---|---|---|
| Yes | Yes | Q3 |
| Yes | No | Q3, Q6 |
| No | N/A | Q3, Q4, Q5, Q6 |

Referring to FIG. 4B, the user has answered question Q1 affirmatively, and answered question Q2 negatively. Thus, as indicated in TABLE I, the questions that are still relevant are Q3 and Q6. As such, questions Q4 and Q5 are displayed with strike-through text, indicating that they are not currently relevant. However, if the user were to subsequently change the answers to questions Q1 and Q2, then questions Q4 and Q5 could also dynamically change and appear as relevant too.

As shown in FIG. 4B, the user completed the answers to questions Q3 and Q6 by indicating an "ABC Corp. yellow" background color and a vertical orientation. Once a complete set of answers is obtained to the currently relevant questions, an embodiment of the invention determines if one or more logos with predetermined brand usages can satisfy the user's answers to the provided questions.

FIG. 4C shows a schema of meta data that includes various descriptive fields for a media object, e.g., a logo. Each field includes a label and a description. The labels corresponding to questions Q1-Q6 of FIG. 4A are indicated as such in FIG. 4C. Thus it may be appreciated that the field labeled ONLINE corresponds to question Q1, and the meta-data associated with this field corresponds to an answer to question Q1. Also, if the meta-data field for Online is YES, then the logo is intended for on-line use, else not. Similarly, the field labeled HEADER corresponds to question Q2, and the actual meta-data stored in this field corresponds to the answer to question Q2.

Reference is now made to TABLE II, which shows a list of 16 logos, in rows labeled L1-L16, along with their associated meta-data, in columns labeled Q3-Q6. It can be seen that the meta-data for each logo corresponds to various answers to the usage questions Q3-Q6 from FIG. 4A. The exemplary meta data schema illustrated in FIG. 4C is an example of a schema to which the meta-data in TABLE II conforms.

TABLE II

Indexing of logo content according to answers to questions

| | | QUESTION | | | |
|---|---|---|---|---|---|
| LOGO | | Q3 BACKGROUND? | Q4 LONG TERM? | Q5 PERMANENT? | Q6 ORIENTATION? |
| "Together with PARTNER" horizontal logos | L1 | ABC Corp. yellow white no specific color | no | no | horizontal |
| | L2 | ABC Corp. gray ABC Corp. silver | no | no | horizontal |
| | L3 | black | no | no | horizontal |
| | L4 | ABC Corp. yellow white no specific color | no | no | horizontal |
| "Together with PARTNER" vertical logos | L5 | ABC Corp. yellow white no specific color | no | no | vertical |
| | L6 | ABC Corp. gray ABC Corp. silver | no | no | vertical |
| | L7 | black | no | no | vertical |
| | L8 | ABC Corp. yellow white no specific color | no | no | vertical |
| ABC Corp. horizontal logos | L9 | ABC Corp. yellow white no specific color | yes | yes | horizontal |
| | L10 | ABC Corp. gray ABC Corp. silver | yes | yes | horizontal |
| | L11 | black | yes | yes | horizontal |
| | L12 | ABC Corp. yellow white no specific color | yes | yes | horizontal |
| ABC Corp. vertical logos | L13 | ABC Corp. yellow white no specific color | yes | yes | vertical |
| | L14 | ABC Corp. gray ABC Corp. silver | yes | yes | vertical |
| | L15 | black | yes | yes | vertical |
| | L16 | ABC Corp. yellow white no specific color | yes | yes | vertical |

Referring now to TABLE II, if the following answers are received

Q1:ONLINE=YES, Q2:HEADER=NO, Q3:BACKGROUND=WHITE, Q6:ORIENTATION=HORIZONTAL then the appropriate logos may be determined from TABLE II to be L1, L4, L9 and L12. Similarly, if the following answers are received, Q1:ONLINE=NO, Q3:BACKGROUND=BLACK, Q4:TIME_FRAME=LONG, Q5:PERMANENT=YES, Q6:ORIENTATION=VERTICAL then the appropriate logo may be determined from TABLE II to be L15.

It is understood that media objects, such as logos may be assigned priorities. For example, Table III herein below provides sample priorities assigned to logos L1-L16 from Table II.

TABLE III

Priorities assigned to logos from TABLE II

| | L1 | L2 | L3 | L4 | L5 | L6 | L7 | L8 | L9 | L10 | L11 | L12 | L13 | L14 | L15 | L16 |
|---|---|---|---|---|---|---|---|---|---|---|---|---|---|---|---|---|
| Priority | 1 | 2 | 3 | 4 | 1 | 2 | 3 | 4 | 1 | 2 | 3 | 4 | 1 | 2 | 3 | 4 |

Thus if logos L1, L4, L9 and L12 are provided to a user by an embodiment of the invention, then L1 and L9 would have higher priorities than L4 and L12.

Although the embodiment described above relates to logos, different embodiments of the invention can be used with a plurality of types of media objects. Thus, different embodiments can be used inter alia to provide brand media objects for signage, brochures, and other marketing and/or sales materials. Furthermore, different embodiments can be employed in different types of marketing campaigns, e.g., direct mail, in store promotions, banners, television, printed publications, e-mail, pay for click search, and advertisements on website landing pages.

The present invention can be used to find appropriate branding media for a specific application or file type, such as a presentation application, spreadsheet application, word processing application, XML file, PERL file, HTML file, and the like. In this regard, different embodiments of the invention may be embodied in different ways, e.g., as a macro, plug-in, applet, control, tool, Application Programming Interface (API), and the like. Also, one or more embodiments provide media objects that are appropriate for use with an application based on the application and/or the file type and/or a particular template being used within the application. Thus, for example, upon opening a file for a presentation application, the embodiment automatically provides media objects to the user that are compatible with that presentation application.

At least one embodiment of the invention can be used to provide a media object that is a presentation, advertisement, and the like. For example, to provide a presentation to a user, one or more questions can be generated and the user's responses employed to determine and provide a relevant presentation, including questions such as:

Q1. Do you want to focus on corporate capabilities or on a specific product?

Q2. If on a specific product, is the presentation for a technical or non-technical audience?

Q3. If for a technical audience, have they signed a non-disclosure agreement, or not?

Q4. How much time would you like for the presentation? (10 minutes, 15 minutes, 20 minutes, 40 minutes)

Q5. Will you be projecting the presentation on a screen, or distributing it in printed form?

Similarly, the invention can be used to locate an appropriate variable data template, vis a vis questions such as:

Q1. Is this a consumer or business advertisement?

Q2. Is this a particular campaign or a brand project?

Q3. In which publication will the advertisement be run?

Q4. What is the size of the advertisement?

Q5. Is the advertisement black & white, or color?

At least one embodiment of the invention can be used to determine and provide the user with different types of media objects for a particular use that are digital representations of images, sounds, and/or videos. For example, a user searching for an image for a presentation may be provided with questions such as:

Q1. What brand is this for?

Q2. What product line are you looking for?

Q3. Do you need a hero shot or a lifestyle shot?

Q4. Do you need a large or a small image?

Thus, it may be appreciated that one or more embodiments can provide one or more types of media objects that are determined to be appropriate for the usage(s) provided by the user in response to at least one query, file type, application, and the like.

Generalized Operation

Figure 5A:
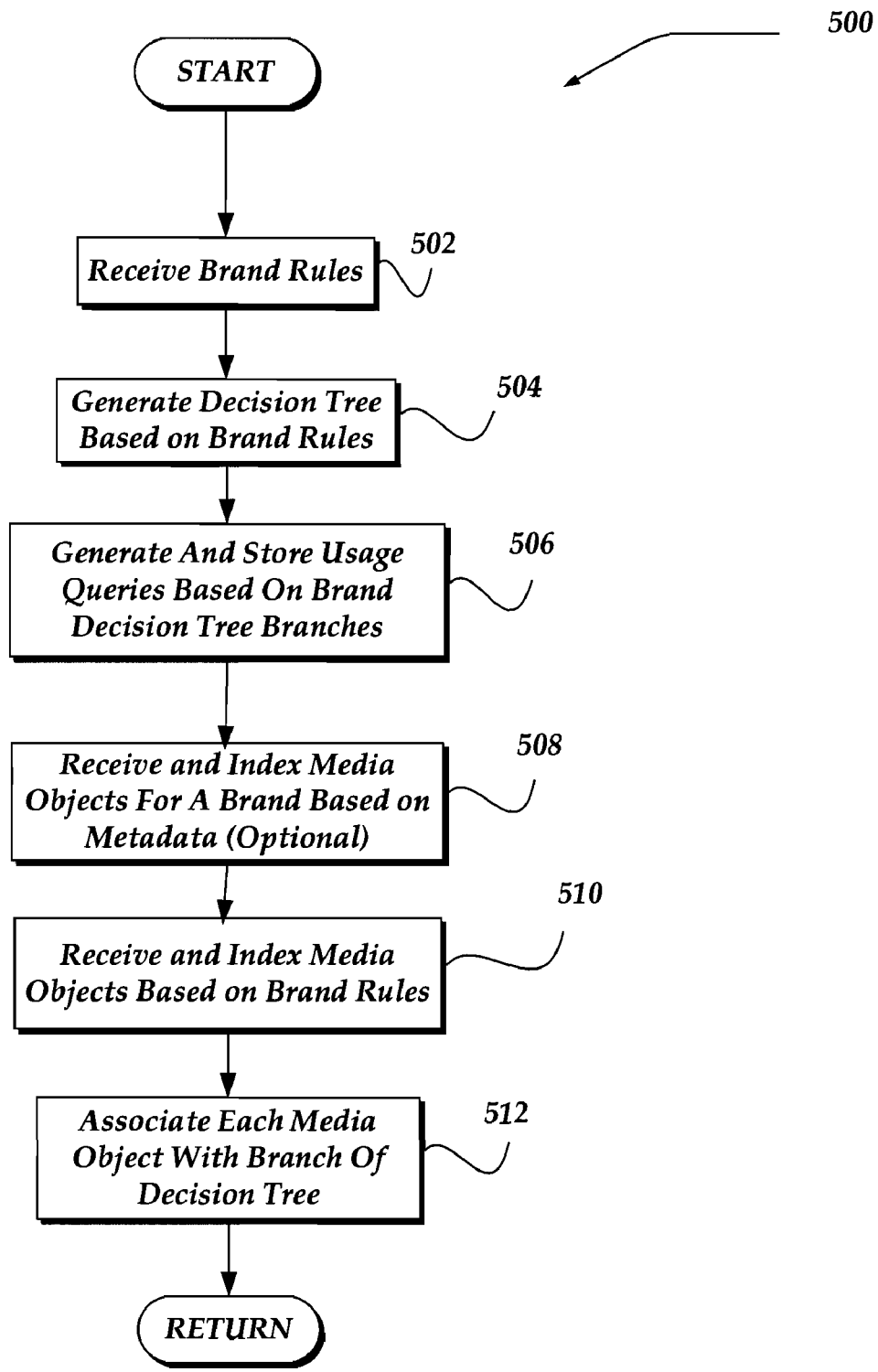
FIG. 5A shows a flow chart for preprocessing brand rules and media objects.
Figure 5B:
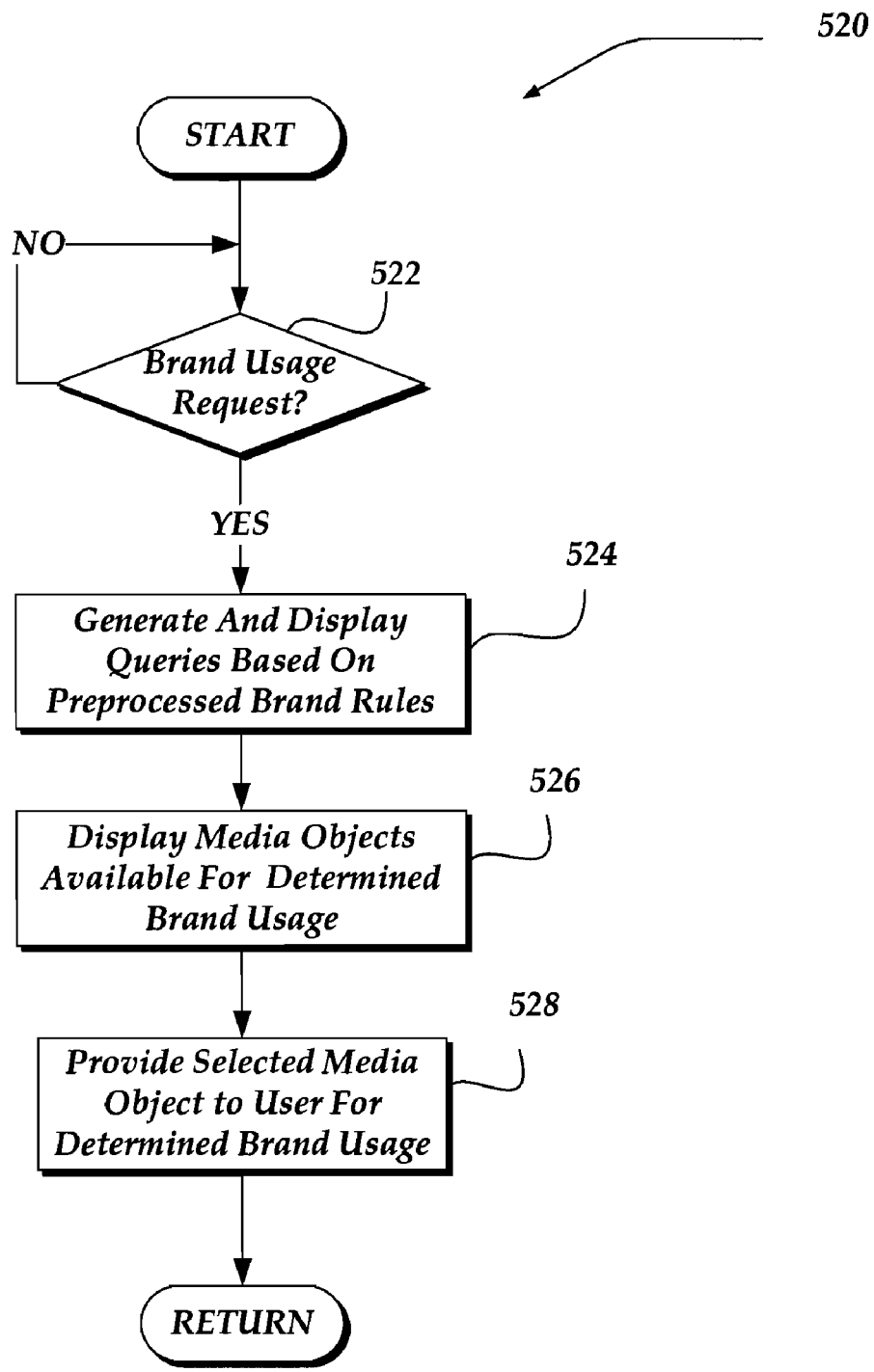
FIG. 5B illustrates a flow chart for providing brand usage queries and media objects.
Figure 6:
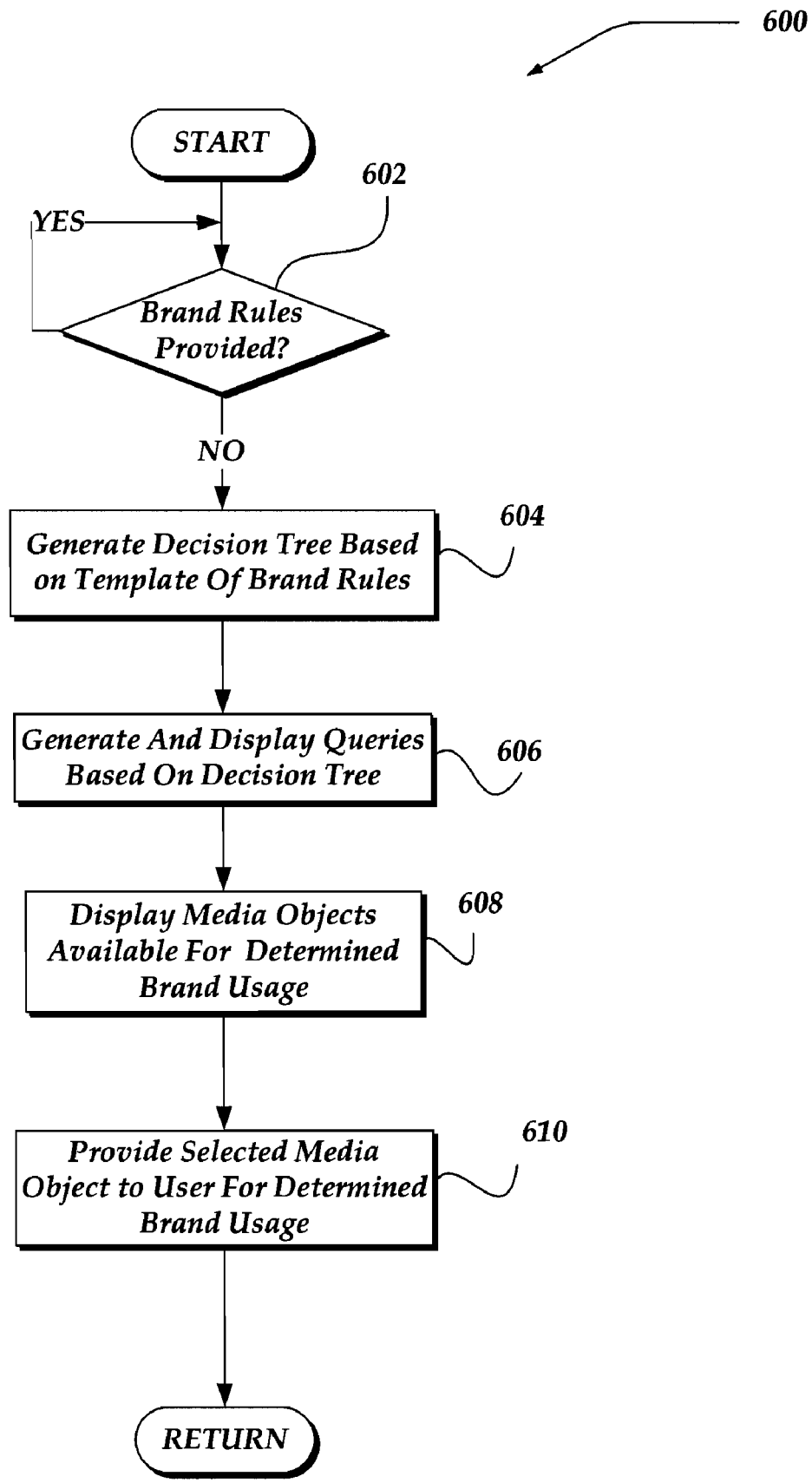
FIG. 6 shows a flow chart for generic brand rules.

The operation of certain aspects of the embodiments of the invention are now described with respect to FIGS. 5A, 5B, and 6.

FIG. 5A is a flow chart illustrating process 500 for preprocessing the generation of queries based on brand rules and received media objects. Moving from a start block, the process steps to block 502 where brand rules can be received regarding the usage of media objects for a brand. At block 504, the process generates a decision tree based on at least one of the received brand rules. In those cases, where incomplete or no rules are provided for use of the brand with received media objects, a template can also be provided to supplement this condition until the template rules are updated. Flowing to block 506, the process generates and stores queries for the user regarding the intended usage of media objects with the brand.

Optionally, at block 508, received media objects are indexed for a database based at least in part on meta data included with at least one of the received media objects. Alternatively, or in addition to the process at block 508, the process steps to block 510 where the received media objects are indexed for a database based at least in part on other brand rules, which can also be received or provided from a template.

At block 512, each media object that is identified for use with the brand is further associated with at least one branch of a decision tree that is generated from the received brand rules. These associations with the media object are stored for subsequent use in generating queries for a user regarding intended use. Next, the process returns to performing other actions.

FIG. 5B is a flow chart illustrating process 520 for displaying queries and providing media objects based on preprocessed brand rules such as shown in FIG. 5A. Moving from a start block, the process steps to decision block 522, where a determination is made as to whether a user has requested a media object for use with a brand; and if true, the process, steps to block 524 where the process displays brand usage queries based on the preprocessed brand rules. In at least one embodiment, as the user answers queries, other unanswered queries may be removed from display or grayed out. At block 526, the process displays media objects that are available for the brand usage determined from the user's answers to the displayed queries. Flowing to block 528, the process provides the selected media object to the user for the determined brand usage. Next, the process returns to performing other actions.

FIG. 6 is a flow chart showing process 600 for generating usage queries for a user if brand rules are not provided. Moving from a start block, the process steps to block 602, where a determination is made as to whether brand rules were provided; and if not, the process steps to block 604 where a decision tree is generated based on a template of brand rules. Stepping to block 606, queries regarding brand usage of media objects are generated based on the decision tree. Also, the brand usage queries are displayed to the user. Flowing to block 608, the process displays media objects that are available for the brand usage determined from the user's answers to the displayed queries. Flowing to block 610, the process provides the selected media object to the user for the determined brand usage. Next, the process returns to performing other actions.

It will be understood that each block of the above flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions executing on the processor provide steps for implementing the actions listed in the flowcharts discussed above.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Application Overview

Figure 7:
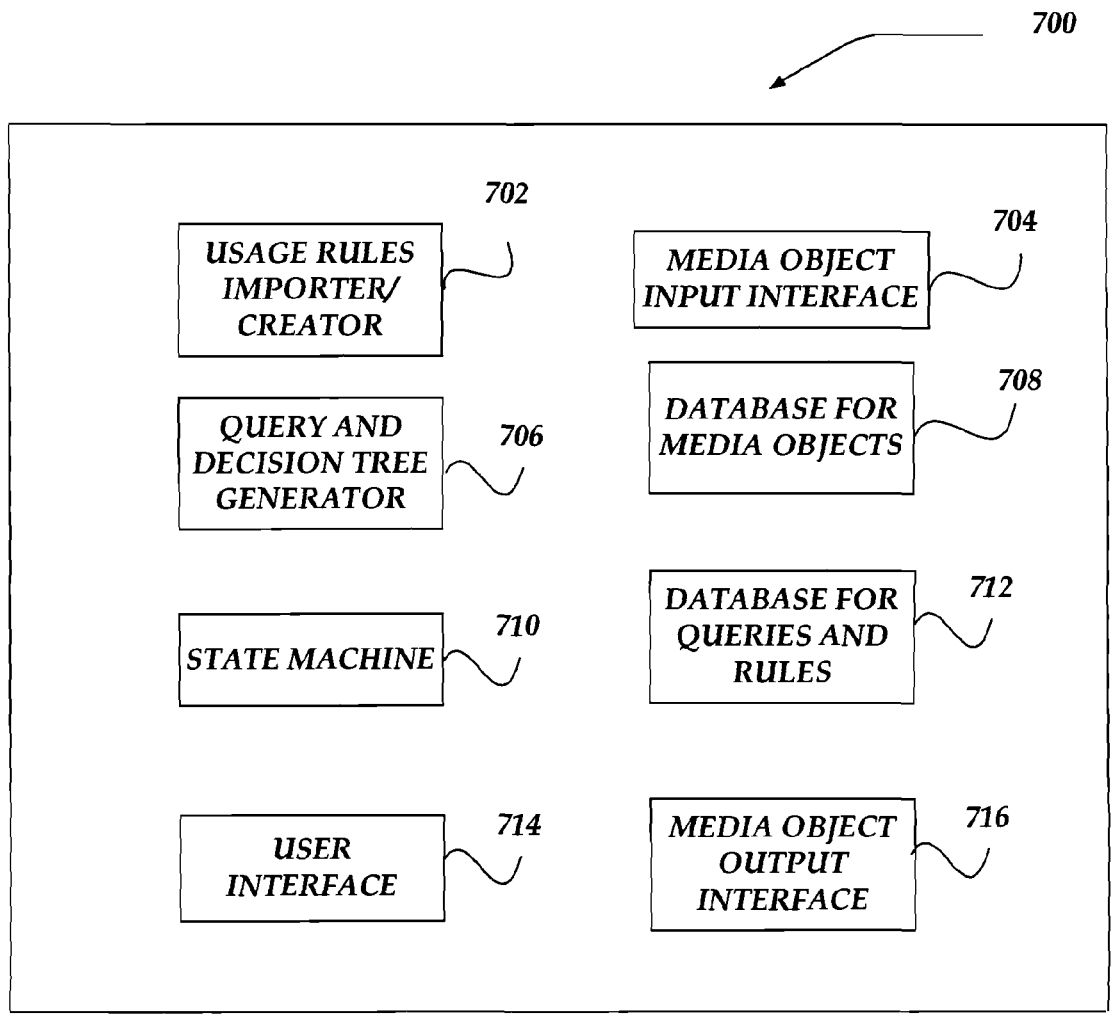
FIG. 7 illustrates a block diagram of components that can be arranged for the processing of brand rules and media objects, in accordance with embodiments of the invention.

FIG. 7 is a block diagram of system 700 with components that can be provided for implementing at least one embodiment of the invention. These embodiments may be implemented as an application or applet, which is separate from and/or a plug-in for another application such as an editor, word processor, DAM, presentation application, spreadsheet application, and the like. The various embodiments can be arranged in different environments, including, but not limited to, host, peer to peer, client-server, and the like.

Component 702 is arranged to receive brand usage rules and enable the creation of new rules. Component 704 enables an input interface to receive media objects that can be used in accordance with the brand usage rules. Component 706 is arranged to generate at least one decision tree based on the brand usage rules; and also generate queries for the user regarding intended uses. Component 708 enables a database for indexing media objects that can be used by a user in accordance with the brand rules. Component 710 is arranged as a state machine that can provide synchronously or asynchronous determinations in response to the user's answers to displayed queries. Component 712 enables a database for indexing provided brand rules and queries that are displayed to the user regarding the use of the media object with a brand Component 714 is arranged to provide an interface for the user to provide answers to the queries and select at least one determined media object for use with the brand. Additionally, component 716 enables an interface for outputting at least one media objects to the user that selects them for use with the brand.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed as new and desired to be protected by Letters Patent of the United States is:

1. A computer-implemented method for providing at least one media object for use with a brand, comprising:
    receiving at least one media object that is available for at least one use with the brand;
    receiving at least one rule for using at least one media object with the brand;
    preprocessing the generation of at least one query for a user based on the received at least one rule for the brand regarding an intended usage of the at least one received media object with the brand; and
    recommending at least one received media object for a user's intended usage with the brand based on at least one response to the at least one query.

2. The computer-implemented method of claim 1, further comprising in response to a selection of at least one recommended media object, providing at least one representation of the selected media object to the user.

3. The computer-implemented method of claim 2, wherein providing the selected media object further comprises:
    determining a type of at least one of a file format associated with the user; and
    enabling the provided media object to be compatible with the determined type of file format.

4. The computer-implemented method of claim 2, wherein providing the selected media object further comprises:
    determining a type of at least one application associated with the user; and
    enabling the provided media object to be compatible with the determined type of application.

5. The computer-implemented method of claim 1, further comprising enabling editing or pre-populating of at least one rule for using at least one media object with the brand.

6. The computer-implemented method of claim 1, further comprising providing a template of at least one rule for generating the at least one query regarding the user's intended usage of at least one media object with the brand.

7. The computer-implemented method of claim 1, wherein generating the at least one query further comprises:
   generating a decision tree based on at least one rule regarding the usage of at least one media object with the brand; and
   providing at least one query for the user based on at least one branch of the decision tree.

8. The computer-implemented method of claim 1, wherein generating the query further comprises:
   receiving metadata that corresponds to a particular media object; and
   employing the received metadata to generate at least one query regarding the user's intended usage of the particular media object.

9. The computer-implemented method of claim 1, further comprising:
   receiving at least one rule for using at least one media object with a brand; and
   employing the at least one received rule to update the availability for using at least one media object with the brand.

10. The computer-implemented method of claim 1, wherein the at least one media object and the at least one rule for the brand is received from a content provider.

11. An apparatus for providing at least one media object for use with a brand, comprising:
   a first component to receive at least one media object that is available for at least one use with the brand;
   a second component that receives at least one rule for using at least one media object with the brand;
   a third component to preprocess the generation of at least one query for a user based on the received at least one rule for the brand regarding an intended usage of the at least one received media object with the brand; and
   a fourth component to recommend at least one received media object for a user's intended usage with the brand based on at least one response to the at least one query.

12. The apparatus of claim 11, further comprising another component to provide a representation of the selected media object to the user in response to a selection of at least one recommended media object.

13. The apparatus of claim 12, wherein providing the selected media object further comprises:
   determining a type of at least one of a file format or an application associated with the user; and
   enabling the provided media object to be compatible with the determined type of file format or application.

14. The apparatus of claim 11, further comprising another component that provides a template of at least one rule for generating the at least one query regarding the user's intended usage of at least one media object with the brand.

15. The apparatus of claim 11, wherein generating the at least one query further comprises:
   generating a decision tree based on at least one rule regarding the usage of at least one media object with the brand; and
   providing at least one query for the user based on at least one branch of the decision tree.

16. The apparatus of claim 11, wherein generating the query further comprises:
   receiving metadata that corresponds to a particular media object; and
   employing the received metadata to generate at least one query regarding the user's intended usage of the particular media object.

17. The apparatus of claim 11, wherein the apparatus is characterized as at least one of a network device, a mobile device, a server, and a client.

18. The apparatus of claim 11, further comprising another component that is arranged to receive at least one rule for using at least one media object with a brand, and employ the at least one received rule to update the availability for using at least one media object with the brand.

19. A system for providing at least one media object approved for use with a brand, comprising:
   a server that performs actions including:
   receiving at least one media object that is available for at least one use with the brand;
   receiving at least one rule for using at least one media object with the brand:
   preprocessing the generation of at least one query for a user based on the received at least one rule for the brand regarding an intended usage of the at least one received media object with the brand; and
   recommending at least one received media object for a user's intended usage with the brand based on at least one response to the at least one query; and
   a client that performs actions, comprising:
   displaying the at least one query for the user;
   displaying the recommended at least one media object; and
   receiving a representation of the selected media object in response to a selection of the at least one recommended media object.

20. The system of claim 19, wherein the server performs further actions, comprising:
   determining a type of at least one of a file format or an application associated with the client; and
   enabling the representation of the selected media object to be compatible with the determined type of file format or application.

21. The system of claim 19, wherein the server performs further actions comprising providing a template of at least one rule for generating the at least one query regarding the user's intended usage of at least one media object with the brand.

22. The system of claim 19, wherein the server generating the at least one query further comprises:
   generating a decision tree based on at least one rule regarding the usage of at least one media object with the brand; and
   providing at least one query for the user based on at least one branch of the decision tree.

23. The system of claim 19, wherein the server generating the query further comprises:
   receiving metadata that corresponds to a particular media object; and
   employing the received metadata to generate at least one query regarding the user's intended usage of the particular media object.

24. The system of claim 19, wherein the server performs further actions comprising:
   receiving at least one rule for using at least one media object with a brand; and
   employing the at least one received rule to update the availability for using at least one media object with the brand.

25. An processor readable medium that includes executable components for providing at least one media object for use with a brand, comprising:
   a first component to receive at least one media object that is available for at least one use with the brand;
   a second component that receives at least one rule for using at least one media object with the brand;

a third component to preprocess the generation of at least one query for a user based on the received at least one rule for the brand regarding an intended usage for the at least one received media object with the brand;

a fourth component to recommend at least one received media object for a user's intended usage with the brand based on at least one response to the at least one query.

26. A computer-implemented method for providing at least one media object for use with a brand, comprising:

receiving at least one media object that is available for at least one use with the brand;

receiving at least one rule for using at least one media object with the brand:

preprocessing the generation of a decision tree based on the received at least one rule regarding the usage of at least one media object with the brand;

associating the at least one received media object with at least one branch of the decision tree;

generating at least one query for a user based on the decision tree regarding an intended usage of at least one received media object with the brand; and recommending at least one received media object for a user's intended usage with the brand based on at least one response to the at least one query.

* * * * *